United States Patent [19]
Baldwin et al.

[11] Patent Number: 5,809,226
[45] Date of Patent: Sep. 15, 1998

[54] METHOD AND APPARATUS FOR TESTING A CONNECTION BETWEEN DIGITAL PROCESSING MODULES, SUCH AS IN DIGITAL PRINTING

[75] Inventors: Steven W. Baldwin, Fairport; William M. OuYang, Rochester; James R. York, Webster; Wayne Cheng, Fairport; Ronald E. McGarvey; Ana M. Perez, both of Rochester; Carolina Creus, Ontario, all of N.Y.; Vernon W. Ulrich, Charlottesville, Va.

[73] Assignee: Xerox Corporation, Stamford, Conn.

[21] Appl. No.: 635,249

[22] Filed: Apr. 12, 1996

[51] Int. Cl.⁶ ............................. G06F 11/00; G01R 31/28
[52] U.S. Cl. ...................... 395/183.19; 371/20.1
[58] Field of Search ................... 371/20.1, 20.2, 371/20.3, 20.4, 20.5; 395/183.19, 183.01

[56] References Cited

U.S. PATENT DOCUMENTS

| | | | |
|---|---|---|---|
| 4,631,698 | 12/1986 | Walsh et al. | 364/900 |
| 5,058,105 | 10/1991 | Mansour et al. | 370/16 |
| 5,155,590 | 10/1992 | Beyers, II et al. | |
| 5,274,446 | 12/1993 | Ashida | 324/158 R |
| 5,276,807 | 1/1994 | Kodama et al. | 395/200 |
| 5,280,623 | 1/1994 | Sodos et al. | 395/325 |
| 5,296,850 | 3/1994 | King | 340/825.49 |
| 5,337,122 | 8/1994 | Hubble, III et al. | 355/208 |
| 5,371,863 | 12/1994 | Silver | 395/325 |
| 5,448,574 | 9/1995 | Yamaguchi | 371/20.1 |
| 5,489,763 | 2/1996 | Conrad et al. | 235/384 |
| 5,506,958 | 4/1996 | Myran | 395/182.16 |
| 5,522,691 | 6/1996 | Anderson et al. | 414/325 |
| 5,612,961 | 3/1997 | Cabezas et al. | 371/20.4 |

FOREIGN PATENT DOCUMENTS

| | | | |
|---|---|---|---|
| 729280 | 8/1996 | European Pat. Off. | H04N 17/00 |

*Primary Examiner*—Albert Decady
*Attorney, Agent, or Firm*—R. Hutter

[57] ABSTRACT

The physical integrity of a large-scale hardware connection between two modules, such as in the context of high-speed digital printing, is tested by entering a diagnostic mode in which single-instruction handshake routines are repeatedly sent from one module to another through a parallel bus. Each handshake routine activates all of the communication lines in the bus. If a sending module does not receive the expected response to the single-instruction handshake routine within a predetermined time, the sending module causes an audible signal to be emitted. Service personnel can manually manipulate various cables, connectors, and sockets forming a hardware connection while the system is in diagnostic mode, to isolate the location of a hardware fault.

13 Claims, 2 Drawing Sheets

METHOD AND APPARATUS FOR TESTING A CONNECTION BETWEEN DIGITAL PROCESSING MODULES, SUCH AS IN DIGITAL PRINTING

The present invention relates to methods and apparatus for testing the integrity of connections between modules which exchange large amounts of digital data at high speed. The present invention has particular use in the context of digital printing devices, and more specifically, in situations where a reading apparatus, such as a bar-code reader or magnetic ink character reader, performs a check on the image quality of documents being produced at high speed.

In the high-speed printing of individual unique documents, such as bills, bank or insurance statements, or checks, typical operating speeds of digital printing equipment can range from 50 to 180 letter-size page images per minute. Each of these uniquely-printed documents contain data which must be precisely rendered, and minor defects in image quality may have significant practical import. It is therefore important that such documents be checked in real time to ensure that, for example the correct numbers are placed on different sheets, and/or that magnetic ink characters, which are used to create negotiable checks, are properly placed on the documents so that the check will not be rejected after it is cashed.

Many high-speed printing systems utilize a reader immediately downstream of the output slot of the printing module. Documents, such as bills and statements, bearing bar-codes are created by the electronic subsystem which controls the print engine, and the reader soon thereafter reads the bar-code created with the printing engine. The number associated with a particular document being created is then compared with what is read by the reader a few seconds later, after the particular document has been printed; if the bar-code number read by the reader does not match the number which had been intended to be printed, the particular document is rejected. Certain error-detection and correction routines can then be set into motion by a discovery of such an error, in a manner which will be discussed in detail below.

The fact that documents are caused to move past a reader at very high speeds requires extremely tight tolerances on the behavior of the reader. Further, the fact that such readers are placed in an office environment where they are subjected to wear and tear in the relatively dirty environment of xerographic printing, places physical stresses on the hardware connecting the reader to the printing apparatus. It has been found that the hardware connection between the reader and the printing apparatus, particularly in hardware between the reader and the printing apparatus, is a common source of system failures. Given the nature of the signals associated with bar-code reading at high-speed, an intermittency in any particular wire in the wire harness or bus can result in a significant performance malfunction which may not be detected until a relatively large number of documents have been printed: if a printer is set to produce 120 page images per minute, a delay of 10 seconds before an error discovered can result in the production of 20 unacceptable documents. Therefore, the context of checking image quality of documents being printed at high speed, either with a reader or with a MICR head, is suitable for very exacting backup systems for ensuring a perfect connection between the reading apparatus and the printing apparatus.

In the prior art, U.S. Pat. No. 4,631,698 discloses a system for testing signal lines between a computer device and a peripheral device. A pair of conductive paths extend between the computer and the peripheral, with each path interconnecting one data line of the computer with one data line of the peripheral. Lights indicate mismatched interconnection of the data lines, and a switch selectively reverses the interconnection of the data lines. Additional conductive paths extend between the connectors, each path interconnecting at least one handshake or control line of each device with at least one handshake or control line of the other device.

U.S. Pat. No. 5,058,105 discloses a facility for detecting a faulty link in a network. Traffic around the faulty link is restored to service by establishing a number of orders of connectivity from spare links.

U.S. Pat. No. 5,296,850 discloses an apparatus and method for generating a wiring map between two sets of terminals which have established communication links. A signal at a first location uniquely identifies each of the terminals by code, frequency, sequence of connection or the like and is transmitted to a second terminal via a respective communication link.

U.S. Pat. No. 5,337,122 discloses a monitoring system for ensuring the integrity of MICR characters. A reader downstream of a printing apparatus outputs an electrical signal representative of a magnetic flux. A comparator operatively connected to the reader compares a signal associated with the magnetic ink characters to a representation of a signal from a standard magnetic ink character.

U.S. Pat. No. 5,489,763 discloses a system and method of printing documents with information encoded thereon in a magnetic strip. The document is printed with machine-readable codes, and the printed codes are read by the system and used to magnetically encode information on the magnetic strip on the document.

Other patents of general relevance to the subject matter of the present invention include U.S. Pat. No. 5,276,807; U.S. Pat. No. 5,280,623; and U.S. Pat. No. 5,371,863.

According to one aspect of the present invention, there is provided a method of testing a connection between a first module and a second module, the first module and second module being intended to exchange digital information over a plurality of parallel communication lines interposed between the first module and the second module. The first module sends and initial digital instruction to the second module through at least some of the plurality of parallel communication lines. The second module responds to the initial digital instruction by sending a response instruction to the first module. The initial digital instruction and the response instruction together cause activity on all of the plurality of parallel communication lines. The first module repeats sending the initial digital instruction to the second module at a frequency of not less than ten times per second. The first module polls the second module to detect a response instruction from the second module within a first predetermined time after sending an initial digital instruction. When the first module does not receive a response instruction from the second module within the first predetermined time, the first module causes a first audible signal to be emitted.

According to another aspect of the present invention, there is provided a method of testing a connection between a printing apparatus and a reading apparatus, the reading apparatus being adapted to read readable images on sheets output by the printing apparatus, where the printing apparatus and reading apparatus are intended to exchange digital information over a plurality of parallel communication lines interposed between the printing apparatus and the reading apparatus. The printing apparatus sends an initial digital instruction to the reading apparatus through at least some of the plurality of parallel communication lines. The reading apparatus responds to the initial digital instruction by sending a response instruction to the printing apparatus. The initial digital instruction and the response instruction together cause activity on all of the plurality of parallel communication lines. The printing apparatus repeats sending the initial digital instruction to the reading apparatus at a frequency of not less than ten times per second. The printing apparatus polls the reading apparatus to detect a response instruction from the reading apparatus within a first predetermined time after sending an initial digital instruction. When the printing apparatus does not receive a response instruction from the reading apparatus within the first predetermined time, the printing apparatus causes a first audible signal to be emitted.

According to another aspect of the present invention, there is provided an apparatus for testing transference of parallel digital data. A plurality of parallel wires are bound together to form a bus. A connector is connected to one end of each of the parallel wires. A test connector, which is physically but not electrically attached to the bus is physically identical to the connector, except for comprising at least one loop-back corresponding to positions of two wires in the connector.

Figure 1:
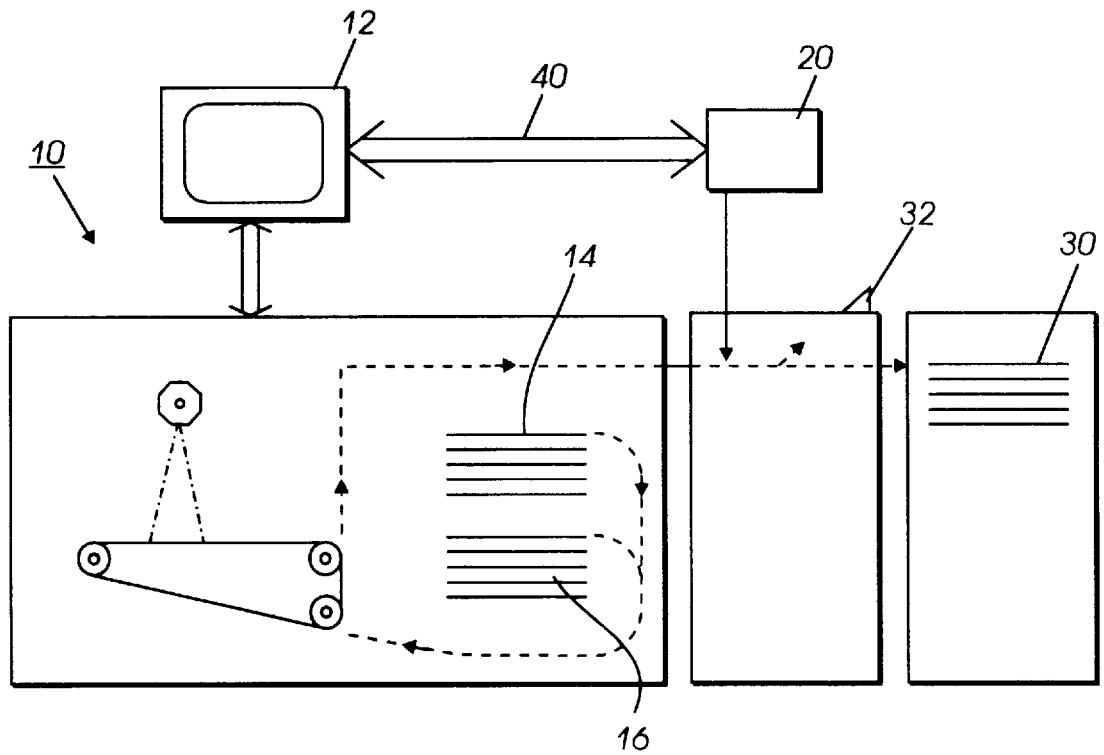
FIG. 1 is a simplified elevational view of a high-speed digital printing apparatus, with a reading and sorting apparatus immediately downstream of the printing apparatus.

FIG. 1 is a simplified elevational view of a high-speed digital printing apparatus, for outputting individually-unique documents, such as bank statements, insurance statements, bills, etc., at a speed typically ranging from 50 to 180 letter-size prints per minute. A print module, here generally indicated as 10, include typical high-speed electrophotographic printing elements, such as a polygon scanner and high-speed photoreceptor, which are generally familiar in the art. Sheets which may represent, for example, stationery for cover letters and different stationery for statements, are selectably drawn from stacks 14 and 16 as needed and passed over a photoreceptor, as shown. The control of the nature of a the images created by printing module 10 is ultimately controlled by what is here indicated as a controller 12.

In order to inspect the various sheets as they are output from printing module 10, there is disposed immediately downstream of the output of printing module 10 a reader here indicated as 20. The reader 20, of a design generally known in the art, is placed in a position relative to the stream of pages coming out of printing module 10, so that it is exposed to readable codes, such as bar-codes, alphanumeric characters, or magnetic strips or characters, which are placed on each sheet by the controller 12. Typically, but not necessarily, these codes which are unique to each sheet being printed are somehow related to humanly-readable information on each sheet: for example, the reader could relate to the addressee, or relate to a check number, or it could relate to the total bill amount on a particular document.

The reader 20 reads the code placed on the different sheets by controller 12, and, typically, the amount read by reader 20 is compared to the amount which had been caused to be placed on that particular sheet by controller 12 a few seconds earlier when the digital image was created. If the amount read by the reader 20 is the same as that as had been placed on the document by controller 12, then the document is passed and permitted to go onto a stack 30. If, however, the number read by reader 20 does not match what had been intended to be placed there by controller 12 a few seconds earlier, the particular document is rejected and placed in a purge tray 32. A human user can examine the rejected documents found in purge tray 32 and decide what corrective actions to be taken, such as whether to re-print the rejected document or to take some other action. In practical use of such equipment as shown in FIG. 1, typical sources of rejected documents include jamming of paper sheets within print module 10, accidentally pulling multiple sheets from stacks 14 or 16, resulting in blank sheets circulating through the system, or xerographic defects causing images such as bar codes to be smudged and made unreadable by bar-code reader 20.

In one preferred embodiment of the present invention, when there are mismatched readings from reader 20 (that is, which do not conform to the digital data used to originally form the document being read), the reject sheets are not only segregated into tray 32 for inspection, but the identity of the reject sheet, identified typically by the digital data which was intended to be placed on the sheet for reading by reader 20, is displayed on a screen associated with controller 12. In one practical embodiment, there is displayed on the screen associated with controller 12 a running tally of the identification numbers of the last five sheets to be rejected.

Given the above description of a reader in use as a quality check for documents being output at high-speed, it will be evident that an important hardware interface which is crucial to the overall success of the apparatus is the hardware connection between reader 20 and controller 12. In FIG. 1 this hardware interface is shown generally as 40, although in a practical situation this interface, or bus, 40 will be typically in the form of a wire harness or parallel connection which may wind through any number of "boxes" of hardware such as paper sorters, and may include any number of sockets and connectors. The absolute integrity of the interface 40 must be guaranteed for the entire system to operate properly. Thus, in service situations in which a technical representative ("tech rep") must open up various hardware modules and isolate the sources of hardware faults, the interface 40 is the subject of intense investigation.

Figure 2:
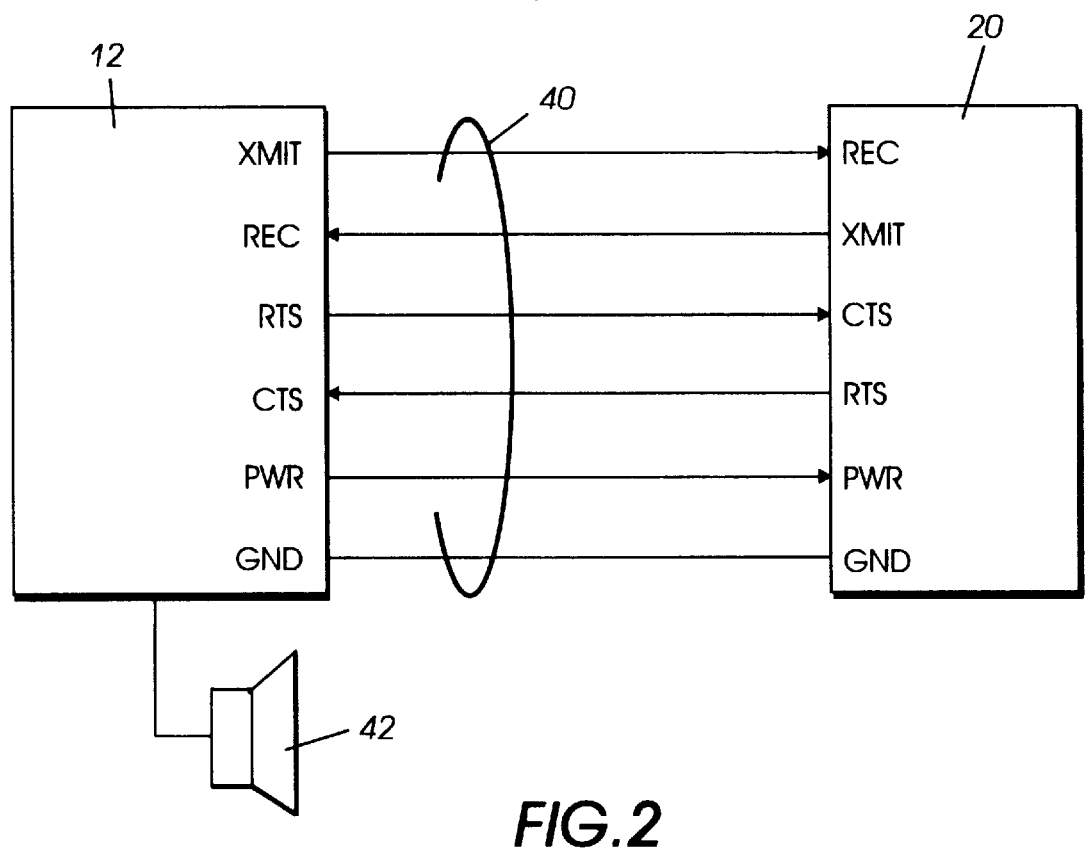
FIG. 2 is a simplified systems view showing basic communication lines in a parallel bus, as would be used with the present invention.

FIG. 2 is a simplified view showing the basic connection which would typically exist between a controller such as 12 (or a particular module or board within controller 12) and a reader such as 20. What is shown in FIG. 2 is basically a simplified version of a standard "RS232" connection which is known in the art, but it will be understood that the basic principles claimed herein are applicable to any type of connection involving the transference of digital data between two largely independent modules.

In the simplified embodiment of FIG. 2, there are six lines, or wires, making up interface or bus 40 and forming a connection between controller 12 and reader 20. Looking at controller 12 on the left, the connections are transmit, receive, request to send (RTS), clear to send (CTS), power, and ground. It will be noted that certain of the connections are "flipped over" in reader 20: the transmit line of controller 12 becomes the receive line in reader 20, and the request to send line in controller 12 becomes the clear to send line in reader 20, and vice-versa. Whatever the particular implementation of the various lines, it will be noted that for at least the four "communication" lines (transmit, receive, request to send and clear to send), a great deal of digital data will pass through the lines at high speed when the system is in operation and reader 20 is sending information about the bar-codes it is reading to controller 12. It will be apparent that different systems may have more than four communication lines between modules.

In operation, according to one particular embodiment of the present invention, when an instruction is desired to be communicated from controller 12 to reader 20, the RTS line, which is typically in a high state, is toggled low for a certain number of milliseconds, and then the controller 12 will receive a clear to send response on its CTS line when reader 20 indicates that it is clear to be sent messages: as with the RTS line, the CTS line is typically in a high state and is toggled low for a few milliseconds to form the clear to send signal. After this handshake is exchanged, an instruction is sent, typically in the form of a byte or small number of bytes over the transmit line where it is received by reader 20. Similarly, when reader 20 wants to send an instruction to controller 12, it too uses a request to send signal and transmits its information over its own transmit line. Typically, the communication of single transactions between the two modules takes no longer than 20 milliseconds.

In maintenance situations, wherein a tech rep is determining whether the connection on interface 40 are satisfactory and not malfunctioning, according to the present invention, the tech rep can control controller 12 to enter a "diagnostic mode." In this diagnostic mode, the controller 12 sends repeated handshake single instruction messages to the reader 20 and reader 20 responds to these initial instructions with its own request to send message and response, which may be simply parroted from the instruction it received from controller 12. For example, according to one embodiment of the present invention, in the diagnostic mode, controller 12 sends a "laser off" instruction approximately 100 times per second to reader 20; this laser off instruction is typically meaningless when applied with such frequency, but the reader 20 will send back the same laser off instruction within a certain predetermined time, such as within 5 milliseconds. Thus, in this diagnostic mode, both the transmit and receive lines, and the RTS and CTS lines, will be regularly activated as many as 200 times per second. It is important, for diagnostic purposes, that all of the communication lines be activated regularly, and at such a frequency that intermittencies (very short interruptions in the connection) can be detected as silences in the pattern.

While the apparatus is in diagnostic mode, the tech rep can manually manipulate any portion of the wire harness, cable, or bus forming interface 40, and also can manipulate any connectors formed between reader and controller 12. According to the present invention, in this diagnostic mode, controller 12 polls the responses made by reader 20 in response to the repeated "laser off" instruction initiated by controller 12; if a response to a particular laser off instruction from controller 12 is not received on controller 12's receive line within a predetermined time period such as one second, or 100 milliseconds or less, according to the present invention, the controller 12 causes, through means such as 42 (the specific nature of which would be familiar to one of skill in the art) an audible signal which can be heard by the tech rep. This audible signal is an alarm indicating that the tech rep, who is in the process of manipulating the various buses, harnesses and connectors, has caused a temporary break in the connection 40 between reader 20 and controller 12.

It is desirable that an audible signal be created by controller 12, for a specific reason: in a typical maintenance situation, the tech rep will not be looking at a screen, but will be looking at the hardware, such as a cable or connector, when such a break is created. It is important, in a maintenance situation, that the tech rep be particularly aware of what he has done to the hardware exactly when the break is caused.

Of course, in the larger context of maintenance, the reason that controller 12 is not receiving the desired responses from reader 20 within a particular time may be for reasons other than a break in the hardware forming interface 40. Another common reason for lack of response from reader 20 is that reader 20 is not on at a particular time. In such a case, the break in interface 40 will not be a mere shortterm "intermittency," but will cause the reader 20 to appear "dead" for several seconds or more to the controller 12. In order to distinguish an intermittency, which is typically caused by a break in the cables forming interface 40, from a malfunction specifically associated with reader 20, it may be desirable to make available to a tech rep servicing the apparatus two types of audible or other signals: the first signal, which is preferably an audible signal, will signal to the tech rep that there has been a momentary intermittency in communication (indicative of a connection failure), while a second signal, which may be audible, or may alternately appear on a screen, can indicate a long term break in communications along interface 40, which may be interpreted as a lack of functioning of the reader 20. In this way, the tech rep is helped in isolating the cause of the fault in either the connector forming interface 40 or a malfunction in the reader itself. In one possible embodiment, a break in communication of less than one second may result in the audible signal, while a break of five seconds or more may be used to create either a second, distinguishable audible signal or the sending of an error message such as "BAR-CODE READER NOT FUNCTIONING" to a screen.

In selecting a proper frequency of operation, in a practical embodiment of the present invention, a handshake, meaning a sending of an initial instruction, should occur with a periodic cycle of 5 to 20 milliseconds, but preferably at no more than 100 milliseconds, or in other words, not less than ten times per second. Again, in a typical practical context as illustrated, the polling system within controller 12 should expect a response instruction from the reader 20 within not more than 100 milliseconds and more typically within about 20 milliseconds, although, of course, the threshold time before an audible signal is caused to be emitted will very depending on the specific technological context of the testing system. Similarly, judging how much time should elapse before the controller 12 determines that reader 20 is not responding at all will also depend on specific circumstances, but would typically be not less than one second.

With reference to the power and ground lines shown in FIG. 2, the power line can be operated in similar fashion to the communication lines, in that, assuming that power for the reader 20 must come through controller 12 and over interface 40, that any short-term (such as one second or less) break in power consumption detected by controller 12 may result in an audible signal, either the same audible signal indicating a break in the communications lines, or else another signal which is specific to a momentary break in the power consumption of reader 20.

It will be apparent that the same basic functionality recited in the claims below can be applied not only to a bar-code reader, but to, for example, a MICR reader, magnetic strip reader, or any kind of optical character recognition (OCR) reader, which is sensitive to the creation of particular images such as alphanumeric characters on sheets being output by printing module 10.

A tech rep trying to isolate the source of a fault in or between either the controller 12, the reader 20, or the interface 40, may occasionally wish to test, in particular, the controller 12 by use of a "loopback": this means that, in the present case, the transmit and receive lines associated with controller 12 will be connected directly to each other as well as the RTS and CTS lines connected to each other, so that the controller 12 is in effect "talking to itself," and not communicating at all with reader 20. (It is also conceivable to form a similar loopback with the reader 20 itself.) In a real-world context, however, making this simple loopback connection can be a tedious process, in that the tech rep must insert short lengths of wire into specific sockets associated with controller 12 and also make sure that, for example, one end of a small bit of wire is connected to a transmit socket while the other end of the wire is connected to the receive socket. Although some tools exist in the art for forming this loopback quickly, according to the present invention, it is more efficient to have a specific "test socket" physically but not electrically connected to the wire harness or bus forming interface 40, this test socket being pre-connected to form the desired loopbacks.

Figure 3:
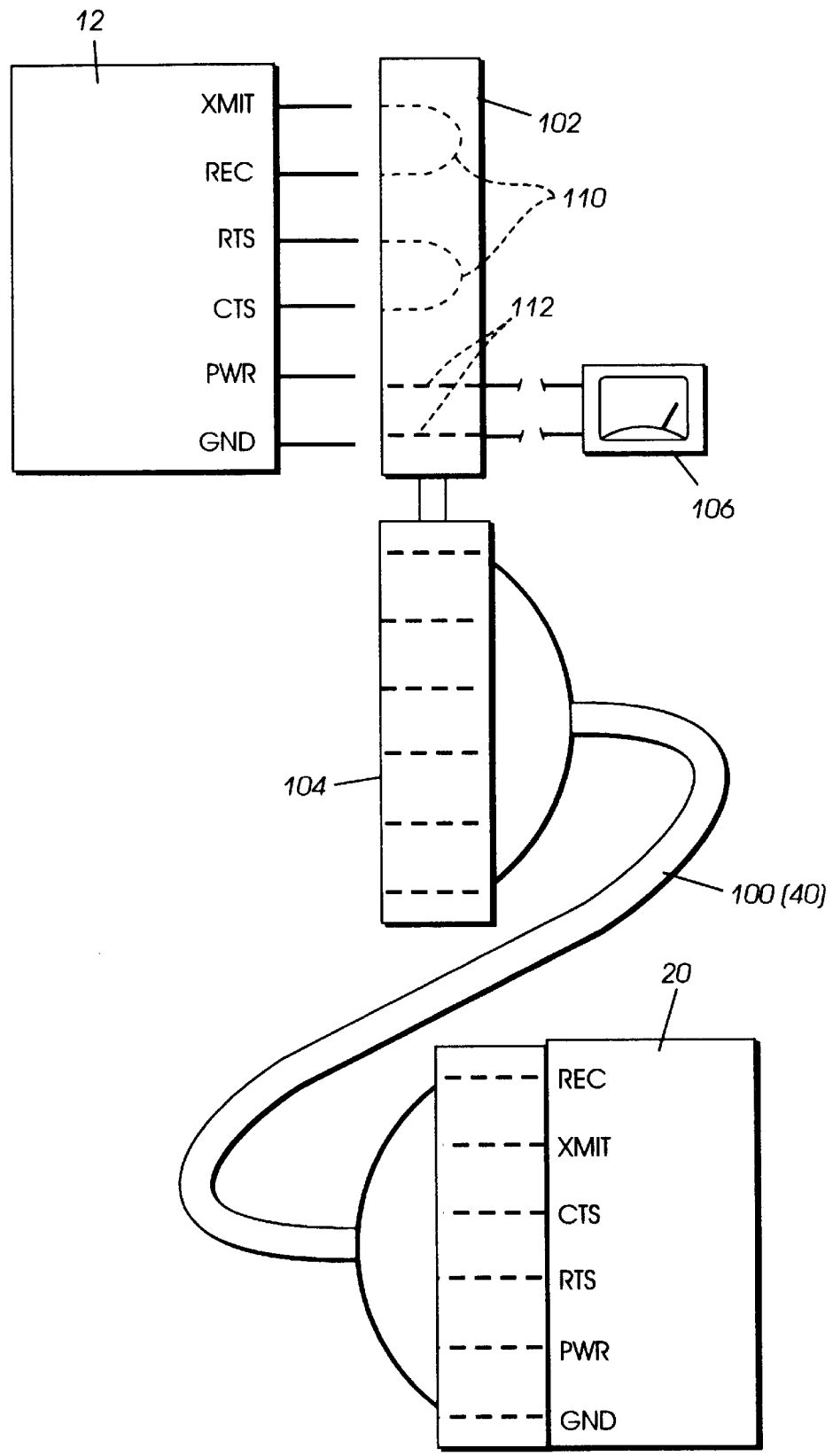
FIG. 3 is a simplified, partially-schematic plan view of a device forming an interface for positioning between two modules, the device further including a test connector according to one aspect of the present invention.

FIG. 3 is a simplified diagram showing preferred embodiment of a cable 100, which itself embodies at least a portion of the interface 40 shown in FIGS. 1 and 2, with the addition of the test connector 102. This test connector 102 is, as mentioned above, permanently attached to the cable 100 or a part thereof such as one end connector, but is not electrically associated with the interface 40 in any way. Rather, test connector 102 is pre-wired, as shown, to loopback the transmit and record lines of controller 12, and also loopback the RTS and CTS lines of controller 12. Thus, in order to form the desired loopback to isolate the controller 12 in a maintenance situation, the tech rep merely unplugs the real connector, hereshown as 104, which connects the correct line to interface 40 and ultimately to reader 20, and replaces, in the socket of controller 12 the real connector 104 with the test connector 102, which as shown in FIG. 3, forms the desired loopbacks of the transmit, receive, RTS, and CTS lines. It will further be noted that test connector 102 passes through the power and ground lines, such as to another socket, so that the tech rep can attach these lines to, for example, a meter 106, as shown, to test the power and ground lines separately.

Looking closely at test connector 102, it will be seen that the two loops indicated as 110 function as loop-backs, respectively, for the transmit and receive line, and for the RTS and CTS line of controller 12. The wires indicated as 112 are "pass-throughs", which may themselves form sockets, which can be accessed by an external meter such as 106.

The advantage of the cable 100 with its test connector 102 is that a tech rep, working in a short time constraint, will always have the desired loopback connection pre-made for him when it is desired to isolate the controller 12 for testing. The tech rep does not have to start from scratch in determining which specific line is the transmit or receive line for example; by simply plugging in the test connector 102, all the desired loopback and pass-throughs are made. Because the test connector 102 is always associated with the real connector 104, the specific loopbacks appropriate for that particular machine are always immediately available. The cable 100 shown in FIG. 3 is cheaper, faster, and safer than prior art manual methods of effecting the desired loopback in a maintenance situation.

While the invention has been described with reference to the structure disclosed, it is not confined to the details set forth, but is intended to cover such modifications or changes as may come within the scope of the following claims.

We claim:

1. A method of testing a connection between a first module and a second module, the first module and second module being intended to exchange digital information over a plurality of parallel communication lines interposed between the first module and the second module, comprising the steps of:

the first module sending an initial digital instruction to the second module through at least some of the plurality of parallel communication lines;

the second module responding to the initial digital instruction by sending a response instruction to the first module, the initial digital instruction and the response instruction together causing activity on all of the plurality of parallel communication lines;

the first module repeating sending the initial digital instruction to the second module at a frequency of not less than ten times per second;

the first module polling the second module to detect a response instruction from the second module within a first predetermined time after sending an initial digital instruction;

when the first module does not receive a response instruction from the second module within the first predetermined time, the first module causing a first audible signal to be emitted;

the first module polling the second module to detect a response instruction from the second module within a second predetermined time longer than the first predetermined time after sending an initial digital instruction; and when the first module does not receive a response instruction from the second module within the second predetermined time, the first module causing a second signal to be emitted, the second signal being different from the first audible signal.

2. The method of claim 1, wherein a power line is interposed between the first module and the second module, and further comprising the steps of the first module detecting power consumption on the power line by the second module; and when the first module does not detect power consumption by the second module within the first predetermined time, the first module causing an audible signal to be emitted.

3. The method of claim 1, wherein the first predetermined time is not more than 100 milliseconds.

4. The method of claim 1, wherein the second predetermined time is not less than one second.

5. A method of testing a connection between a printing apparatus and a reading apparatus, the reading apparatus being adapted to read readable images on sheets output by the printing apparatus, the printing apparatus and reading apparatus being intended to exchange digital information over a plurality of parallel communication lines interposed between the printing apparatus and the reading apparatus, comprising the steps of:

the printing apparatus sending an initial digital instruction to the reading apparatus through at least some of the plurality of parallel communication lines;

the reading apparatus responding to the initial digital instruction by sending a response instruction to the printing apparatus within not less than 20 milliseconds of receiving the initial digital instruction, the initial digital instruction and the response instruction together causing activity on all of the plurality of parallel communication lines;

the printing apparatus repeating sending the initial digital instruction to the reading apparatus at a frequency of not less than ten times per second;

the printing apparatus polling the reading apparatus to detect a response instruction from the reading apparatus within a first predetermined time after sending an initial digital instruction;

when the printing apparatus does not receive a response instruction from the reading apparatus within the first predetermined time, the printing apparatus causing a first audible signal to be emitted;

the printing apparatus polling the reading apparatus to detect a response instruction from the reading apparatus within a second predetermined time longer than the first predetermined time after sending an initial digital instruction; and when the printing apparatus does not receive a response instruction from the reading apparatus within the second predetermined time, the printing apparatus causing a second signal to be emitted, the second signal being different from the first audible signal.

6. The method of claim 5, wherein the reading apparatus is a bar-code reader.

7. The method of claim 5, wherein the reading apparatus is a MICR reader.

8. The method of claim 5, wherein the reading apparatus is an OCR reader.

9. The method of claim 5, wherein a power line is interposed between the printing apparatus and the reading apparatus, and further comprising the steps of the printing apparatus detecting power consumption on the power line by the reading apparatus; and when the printing apparatus does not detect power consumption by the reading apparatus within the first predetermined time, the printing apparatus causing an audible signal to be emitted.

10. The method of claim 5, wherein the first predetermined time is not more than 100 milliseconds.

11. The method of claim 5, wherein the second predetermined time is not less than one second.

12. An apparatus for testing transference of parallel digital data, comprising:

a plurality of parallel wires, bound together to form a bus;

a connector, the connector being connected to one end of each of the parallel wires;

a test connector, the test connector being physically but not electrically attached to the bus, the test connector being physically identical to the connector except for comprising at least one loop-back corresponding to positions of two wires in the connector.

13. The apparatus of claim 12, the test connector further comprising at least one pass-through corresponding to a position of one wire in the connector.

* * * * *